United States Patent [19]

Perry

[11] 3,744,530

[45] July 10, 1973

[54] POLYMER-HANDLING PROCESS
[75] Inventor: Robert J. Perry, Houston, Tex.
[73] Assignee: Phillips Petroleum Company, Bartlesville, Okla.
[22] Filed: Feb. 19, 1971
[21] Appl. No.: 117,037

[52] U.S. Cl. .............................................. 138/145
[51] Int. Cl. .............................................. F16l 9/14
[58] Field of Search................... 138/140, 145, 146; 137/1, 13; 260/79.1; 117/95, 128.4

[56] References Cited
UNITED STATES PATENTS
2,818,079  12/1957  Garrison................................. 137/1
3,354,129  11/1967  Edmonds, Jr. et al............. 260/79.1

Primary Examiner—Martin P. Schwadron
Assistant Examiner—David R. Matthews
Attorney—Young & Quigg

[57] ABSTRACT

Polyphenylene sulfide coated pipe is employed in the conduit system of a polymerization process. The method of coating the pipe is also disclosed.

1 Claim, No Drawings

POLYMER-HANDLING PROCESS

This invention relates to polymer solution flow.

In one of its more specific aspects, this invention relates to improved means for conveying polymers and the solutions in which they are produced.

The production of olefin polymers and the processes for producing them are well known. These processes involve the polymerization of olefins of like or different kinds in the presence of catalyst to produce polymeric materials such as polyethylene, polypropylene and the like.

During the course of the process it is necessary to convey polymer solutions containing catalysts, the olefin in these solutions being in various stages of polymerization. Such solutions are frequently conveyed through conduit which is made up of fittings such as elbows, tees, and the like. The presence of such fittings together with the presence of pockets, low spots and the like which invariably exist in conduit systems, gives rise to relatively stagnant areas in which the catalyst tends to collect and wherein, as a result of that collection, undesired polymerization occurs. This polymerization produces solids whose accumulation is gradual but the presence of which eventually requires plant shutdown for removal.

Some relief has resulted from the use of stainless steel conduit, the internal surfaces of the conduit being polished to minimize irregularities and polymer buildup. However, such piping is expensive, its internal surfaces tend to scratch and erode with the result that such conduit has a short usable life.

The method and apparatus of this invention solves that problem. According to the method of this invention, there is provided a process which comprises passing the solution through a conduit having that surface in contact with said solution substantially covered with polyphenylene sulfide in an amount sufficient to facilitate the continued flow of said solution through said conduit.

Also according to this invention, there is provided an interiorly-coated conduit produced by introducing a composition comprising a fluid and polyphenylene sulfide onto the surface of a conduit, the surface being maintained at a temperature between about 500° F. and 900° F. The fluid is removed from the conduit to leave the polyphenylene sulfide in adherence with the surface. The coating is then cured for a period of about 48 hours after which the conduit can be put into use or can be bent.

This invention contemplates the coating of interior surfaces of conduit and related fittings with polyphenylene sulfide and the employment of such conduit and related fittings in the transfer of polymer solutions. Polyphenylene sulfide so deposited is durable, erosion resistant and has a high melting point and can, accordingly, be subjected to high operating temperatures without disturbance of the coating.

Polyphenylene sulfide can be deposited in any of its known forms, these including poly(p-phenylene sulfide), poly(4,4'-biphenylene sulfide), modified poly(p-phenylene sulfide) and other aromatic resins such as those in U.S. Pat. No. 3,354,129. However, it is most advantageously deposited in that form in which it contains a filler, such as iron oxide, in an amount between about 5 to about 30 weight percent after conventional methods of degreasing and cleaning the surface to be coated.

The polyphenylene sulfide can be deposited within the conduit either by pumping therethrough at a temperature above its melting point to produce a film adhering to the internal surface of the pipe or it can be deposited from a fluid slurry which is pumped into the conduit or which is sprayed on the conduit surface. Slurries are prepared containing about 35–50 weight percent solids using hydrocarbons, solvents or water as the carrier to produce a coating of the desired thickness, preferably from about 1 to about 10 mils, preferably from about 8 to about 10 mils.

After the coating deposition, the conduit is cured or, if bending is required, the pipe is bent.

The pipe can be cold-bent within about 48 hours of the deposition of the polyphenylene inasmuch as the polyphenylene remains in an amorphous, flexible state for that period but acquires a crystallinity thereafter which makes satisfactory bending difficult.

The coated pipe is bent by any of the standard procedures but is preferably bent in the absence within the pipe of fillers, such as sand, which would pit the coating. It can be bent employing particulate polyphenylene sulfide as an internal filler. Any particulate matter adhering to the wall after the bending will be incorporated into the coating in the subsequent aftertreating of the pipe.

The coated pipe is aftertreated by holding at a temperature just below that temperature at which the polyphenylene sulfide tends to flow from the coated surface, that is, at a temperature of from about 500° F. to about 900° F., depending upon the amount of filler the coating contains. It is held at this temperature for a period of about one hour after which it is water or air-quenched to room temperature.

The best mode of practicing the method of this invention is illustrated by the following example.

A six-inch nominal diameter carbon steel pipe of 20 foot nominal length was capped at both ends and polyphenylene sulfide particles in nitrogen were introduced into the pipe and onto its hot walls which were held at a temperature of about 650° F. The nitrogen was removed from the pipe under vacuum, leaving the polyphenylene sulfide adhering to the walls of the pipe.

After the introduction of sufficient polyphenylene sulfide to provide a coating of about 8 mils on the wall of the pipe, the pipe was allowed to cool to room temperature whereupon, within 24 hours, it was bent without employment of a filler, the bend having a 6 foot radius.

The finished pipe was satisfactorily employed in the manufacture of polypropylene, its cost being about 10 percent of the cost of the stainless steel pipe it replaced.

It will be evident from the foregoing that various modifications can be made to the method of this invention. Such, however, are considered to be within the scope of the invention.

What is claimed is:

1. A conduit having a surface adapted for the flow of fluids in contact therewith, said surface being comprised of a film of poly(phenylene sulfide) and iron oxide, said film having a thickness within the range of from about 1 to about 15 mils and containing iron oxide in an amount within the range of from about 5 to about 30 weight percent.

* * * * *